Oct. 28, 1924.
T. ZIMMERMAN
BRAKE
Filed Feb. 6, 1919
1,513,359
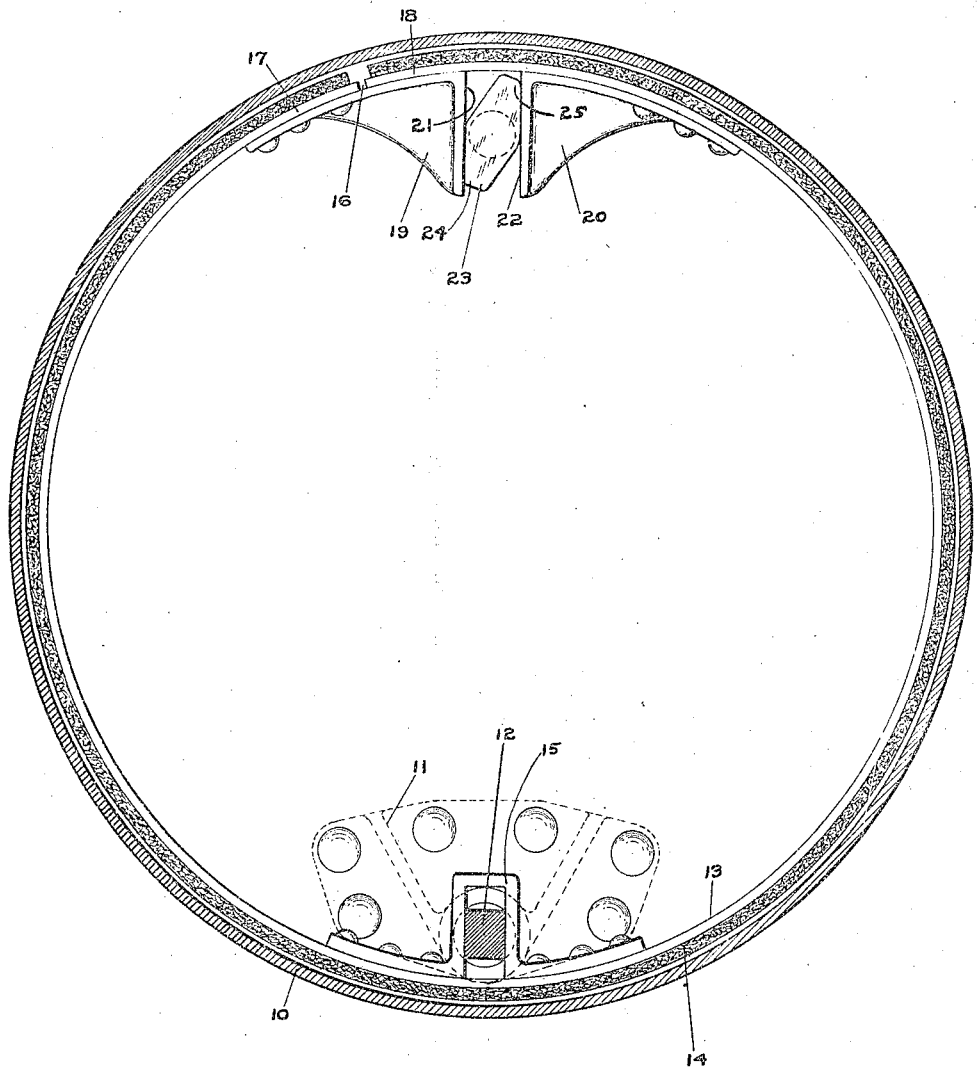
Inventor
THOMAS ZIMMERMAN.
By
Attorney Patented Oct. 28, 1924.

1,513,359

UNITED STATES PATENT OFFICE.

THOMAS ZIMMERMAN, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO.

BRAKE.

Application filed February 6, 1919. Serial No. 275,366.

*To all whom it may concern:*

Be it known that I, THOMAS ZIMMERMAN, a citizen of the United States, and a resident of Cleveland, county of Cuyahoga, State of Ohio, have invented certain new and useful Improvements in Brakes, of which the following is a specification.

This invention relates to brakes and has for its object the provision of a brake band so arranged that neither end will be drawn away from the brake drum by the actuating mechanism, thereby improving the efficiency and durability of the brake.

Other objects and the features of novelty will be apparent from the following description taken in connection with the accompanying drawing, which is a side view of a brake embodying the invention.

Referring to the drawing, 10 indicates the cylindrical flange of the ordinary brake drum that is usually employed on a motor vehicle. The flange 10 is shown in section, and, for clearness, the center of the drum has been omitted. A bracket 11, such as is commonly employed and secured to the stationary axle (not shown), carries an anchor pin, or stud, 12 for the brake band 13, which, in the present case, is shown as operating on the interior of the drum 10. The band 13 may be in one or more sections and has on its outer surface the brake lining 14 and on its inner surface a bracket 15 slotted to receive the anchor 12, whereby the band is held from rotation with the drum 10, when applied to the latter.

The brake band is split, as indicated at 16, and the ends 17 and 18 are relatively movable circumferentially, for the purpose of expanding and contracting the band. The end 17 carries a bracket 19 and the end 18 carries a bracket 20, and these brackets are unsymmetrically arranged with respect to the ends of the band, being circumferentially offset relative to the space between the ends of the band and have the opposing surfaces 21 and 22, respectively, which cooperate with the cam 23, the latter being the means for actuating the brake. It will be observed that the bracket 19 overlaps the end 18 of the band and prevents the latter from moving radially inward.

When the cam 23 is rotated in the direction of the arrow thereon, for the purpose of setting the brake, the corner 24 of the cam tends to drag the bracket 19 and the end 17 of the brake band outwardly against the brake drum, whereas the corner 25 of the cam tends to drag the bracket 20 and the end 18 of the brake band in the opposite direction, or away from the brake drum. The latter movement, however, is prevented, by the overlapping arrangement of the bracket 19 and the end 18 of the band, so that the latter moves only circumferentially to expand the band against the drum.

Having thus described my invention, what I claim is:

In brake mechanism, the combination of a brake drum, a brake band cooperating therewith and having slightly spaced ends relatively movable circumferentially of said drum, a pair of spaced brackets, one secured to each of said ends, arranged in circumferentially offset relation to the space between the ends of said band whereby one of said brackets projects across the space between the ends of said band and overlaps and engages the opposite end of the band when the latter is pressed against said drum, and actuating means between said brackets and cooperating therewith.

In testimony whereof I affix my signature.

THOMAS ZIMMERMAN.